(12) United States Patent
Wang et al.

(10) Patent No.: US 12,113,180 B2
(45) Date of Patent: Oct. 8, 2024

(54) CHARGE-DISCHARGE CONTROL CIRCUIT, METHOD, DEVICE AND STORAGE MEDIUM

(71) Applicant: CONTEMPORARY AMPEREX TECHNOLOGY (HONG KONG) LIMITED, Hong Kong (CN)

(72) Inventors: Xingchang Wang, Ningde (CN); Wei Tian, Ningde (CN); Fangyou Lu, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 86 days.

(21) Appl. No.: 18/046,146

(22) Filed: Oct. 12, 2022

(65) Prior Publication Data

US 2023/0216094 A1 Jul. 6, 2023

Related U.S. Application Data

(63) Continuation of application No. PCT/CN2022/096751, filed on Jun. 2, 2022.

(30) Foreign Application Priority Data

Jan. 6, 2022 (CN) .......................... 202210013620.3

(51) Int. Cl.
*H01M 10/42* (2006.01)
*B60R 16/033* (2006.01)
(Continued)

(52) U.S. Cl.
CPC ......... *H01M 10/425* (2013.01); *B60R 16/033* (2013.01); *H01M 10/44* (2013.01);
(Continued)

(58) Field of Classification Search
CPC .. H01M 10/425; H01M 10/44; H01M 10/486; H01M 10/615; H01M 10/625;
(Continued)

(56) References Cited

U.S. PATENT DOCUMENTS

2010/0055549 A1* 3/2010 Corder ................ H01M 50/244
429/97
2013/0026995 A1 1/2013 Kitajima et al.
(Continued)

FOREIGN PATENT DOCUMENTS

CN 102237706 A 11/2011
CN 103367820 A 10/2013
(Continued)

OTHER PUBLICATIONS

International Search Report and Written Opinion received in PCT Application PCT/CN2022/096751 on Sep. 15, 2022.
(Continued)

*Primary Examiner* — Rexford N Barnie
*Assistant Examiner* — Thai H Tran
(74) *Attorney, Agent, or Firm* — Kilpatrick Townsend & Stockton LLP (57) ABSTRACT

A charge-discharge control circuit, method, device and a storage medium are provided. In some embodiments, the circuit includes: a starting power supply; and a main positive switch unit. In those embodiments, a first terminal of the main positive switch unit is connected to the starting power supply, and a second terminal of the main positive switch unit is connected to a generator of the vehicle and a load of the vehicle. The main positive switch unit is configured to interrupt a current in a first current direction, which is a current direction when the generator charges the starting power supply. The circuit also includes a battery management module configured to detect a voltage of the starting
(Continued)

power supply, and control the main positive switch unit to interrupt the current in the first current direction when the voltage of the starting power supply reaches a preset voltage threshold.

18 Claims, 3 Drawing Sheets

(51) Int. Cl.
| | |
|---|---|
| *H01M 10/44* | (2006.01) |
| *H01M 10/48* | (2006.01) |
| *H01M 10/615* | (2014.01) |
| *H01M 10/625* | (2014.01) |
| *H01M 10/63* | (2014.01) |
| *H01M 10/6572* | (2014.01) |
| *H01M 50/583* | (2021.01) |
| *H02J 7/00* | (2006.01) |

(52) U.S. Cl.
CPC ....... *H01M 10/486* (2013.01); *H01M 10/615* (2015.04); *H01M 10/625* (2015.04); *H01M 10/63* (2015.04); *H01M 10/6572* (2015.04); *H01M 50/583* (2021.01); *H02J 7/00304* (2020.01); *H02J 7/0034* (2013.01); *H02J 7/007182* (2020.01); *H02J 7/007194* (2020.01); *H01M 2010/4271* (2013.01); *H01M 2200/103* (2013.01); *H01M 2220/20* (2013.01)

(58) Field of Classification Search
CPC ............ H01M 10/63; H01M 10/6572; H01M 50/583; H01M 2010/4271; H01M 2200/103; H01M 2220/20; B60R 16/033; B60R 16/03; B60R 16/0307; H02J 7/00304; H02J 7/0034; H02J 7/007182; H02J 7/007194; H02J 7/00; H02J 2310/46; H02J 7/00302; H02J 7/00306; H02J 7/00308; H02J 7/00309; H02J 7/14; H02J 7/1492; H02J 7/0031; H02H 3/18; H05B 3/16; H05B 3/20; H05B 2203/013

See application file for complete search history.

(56) References Cited

U.S. PATENT DOCUMENTS

| | | | | |
|---|---|---|---|---|
| 2014/0291309 | A1* | 10/2014 | Juvani | ............... H01M 10/63 219/535 |
| 2016/0126760 | A1 | 5/2016 | Murata | |
| 2016/0190661 | A1* | 6/2016 | Kuruma | ................ B60L 58/27 701/36 |
| 2016/0201634 | A1* | 7/2016 | Kim | ...................... B60L 50/64 320/136 |

FOREIGN PATENT DOCUMENTS

| | | |
|---|---|---|
| CN | 205406647 U | 7/2016 |
| CN | 106935753 A | 7/2017 |
| CN | 206806379 U | 12/2017 |
| CN | 208078677 U | 11/2018 |
| EP | 2797201 A2 | 10/2014 |
| JP | 2011234479 A | 11/2011 |
| JP | 2013027273 A | 2/2013 |
| JP | 2013233072 A | 11/2013 |
| JP | 2014217169 A | 11/2014 |
| JP | 2016092953 A | 5/2016 |

OTHER PUBLICATIONS

The extended European search report received in the corresponding European application 22764992.8, mailed Nov. 28, 2023.
Notice of Reasons for Refusal received in the corresponding Japanese application 2022-552286, mailed Feb. 26, 2024.

* cited by examiner

CHARGE-DISCHARGE CONTROL CIRCUIT, METHOD, DEVICE AND STORAGE MEDIUM

CROSS-REFERENCE TO RELATED APPLICATIONS

The present application is a continuation of International Application PCT/CN2022/096751, filed Jun. 2, 2022, which claims priority to Chinese patent application No. 202210013620.3, filed on Jan. 6, 2022 and entitled "CHARGE-DISCHARGE CONTROL CIRCUIT, METHOD, DEVICE AND STORAGE MEDIUM", which are incorporated herein by reference in their entireties.

TECHNICAL FIELD

The present application generally relates to a technical field of relay protection, and in particular, to a charge-discharge control circuit, method, device and a storage medium.

BACKGROUND

At present, a starting power supply of a vehicle usually receives a voltage output by a generator of the vehicle for charging, and outputs a stable voltage to supply power to each load of the vehicle. Under a condition that the output voltage of the generator cannot be adjusted, the starting power supply is prone to overcharge after the starting power supply is fully charged, resulting in an overcharge failure. In order to avoid overcharging of the starting power supply, under a condition that the starting power supply is fully charged, the starting power supply can be disconnected from the main circuit in the vehicle to prevent the generator from continuing to charge the starting power supply. However, at this time, the starting power supply cannot continue to output a stable voltage to supply power to each load, which is likely to cause load abnormalities and lead to safety accidents.

SUMMARY

Some embodiments in accordance with the present disclosure provide a charge-discharge control circuit, method, device and a storage medium, which can solve the technical problems of load abnormalities and safety accidents caused by the starting power supply of the vehicle cutting off the current loop under a condition that the starting power supply is fully charged.

In a first aspect, an embodiment in accordance with the present disclosure provides a charge-discharge control circuit applied to a vehicle, wherein the circuit includes:
  a starting power supply;
  a main positive switch unit, wherein a first terminal of the main positive switch unit is connected to the starting power supply, a second terminal of the main positive switch unit is connected to a generator of the vehicle, and the second terminal of the main positive switch unit is connected to a load of the vehicle; the main positive switch unit is configured to interrupt a current in a first current direction; the first current direction is a current direction of a charging loop under a condition that the generator charges the starting power supply;
  a battery management module, wherein the battery management module is connected to a control terminal of the main positive switch unit, and the battery management module is connected to the starting power supply, and wherein the battery management module is configured to detect a voltage of the starting power supply, and control the main positive switch unit to interrupt the current in the first current direction under a condition that the voltage of the starting power supply reaches a preset voltage threshold, so that the generator stops charging the starting power supply.

By controlling the current direction of the main positive switch unit, under a condition that the starting power supply is not fully charged, the starting power supply can be charged through the main positive switch unit and the starting power supply can also be discharged through the main positive switch unit. Under a condition that the starting power supply is fully charged, the current direction of the charging loop between the generator and the starting power supply, that is, the first current direction, may be limited. At this time, the starting power supply can still be discharged through the main positive switch unit, and the generator may stop charging the starting power supply. Therefore, under a condition that the voltage of the starting power supply is relatively high, the charging may be stopped and the starting power supply outputting a stable voltage to supply power to the load may be guaranteed.

In some embodiments, the main positive switch unit includes:
  a first switch, wherein a first terminal of the first switch is connected to a positive electrode of the starting power supply, and a second terminal of the first switch is connected to a first terminal of the generator and a first terminal of the load;
  a reverse protection module, wherein the reverse protection module is connected in parallel with the first switch, and the reverse protection module is configured to maintain a current in a second current direction under a condition that the first switch is turned off, the second current direction is a current direction of a power supply loop under a condition that the starting power supply supplies power to the load;
  wherein the battery management module is configured to turn on the first switch to charge and discharge the starting power supply under a condition that the voltage of the starting power supply is lower than the preset voltage threshold; and turn off the first switch to discharge the starting power supply and stop charging the starting power supply under a condition that the voltage of the starting power supply reaches the preset voltage threshold.

By setting the first switch and the reverse protection module, under a condition that the first switch is turned on, the main positive switch unit can transmit the charging current and the discharging current of the starting power supply, thereby charging and discharging the starting power supply; under a condition that the first switch is turned off, the current direction of the main positive switch unit may be limited to the second current direction by the reverse protection module, and at this time, the starting power supply can continue to supply power to the load, and the generator stops charging the starting power supply.

In some embodiments, the reverse protection module includes:
  a diode, wherein an anode of the diode is connected to the first terminal of the first switch, and a cathode of the diode is connected to the second terminal of the first switch.

The reverse protection module can be a diode, and the current direction can be unidirectionally restricted through the diode.

In some embodiments, the main positive switch unit includes:
- a first field effect transistor, wherein a first terminal of the first field effect transistor is connected to a positive electrode of the starting power supply;
- a second field effect transistor, wherein a first terminal of the second field effect transistor is connected to a first terminal of the generator and a first terminal of the load, and a second terminal of the second field effect transistor is connected to a second terminal of the first field effect transistor;
- wherein the second field effect transistor is provided with a parasitic diode, an anode of the parasitic diode is connected to the second terminal of the second field effect transistor, and a cathode of the parasitic diode is connected to the first terminal of the second field effect transistor;
- wherein the battery management module is configured to turn on the first field effect transistor and the second field effect transistor under a condition that the voltage of the starting power supply is lower than the preset voltage threshold; and turn on the first field effect transistor and turn off the second field effect transistor under a condition that the voltage of the starting power supply reaches the preset voltage threshold.

By setting two relatively series-connected field effect transistors, under a condition that both field effect transistors are turned on, the starting power supply can be charged and discharged. Under a condition that the first field effect transistor is turned on and the second field effect transistor is turned off, the parasitic diode of the second field effect transistor can interrupt the current in the first current direction. At this time, the starting power supply can continue to supply power to the load, and the generator stops charging the starting power supply.

In some embodiments, the first field effect transistor is provided with a parasitic diode, and the parasitic diode of the first field effect transistor is configured to interrupt a current in a second current direction under a condition that the first field effect transistor is turned off.

By controlling the first field effect transistor to be turned off and the second field effect transistor to be turned on, the main positive switch unit may interrupt the current in the second current direction. Under a condition that the generator is charging the starting power supply, the stable voltage output by the starting power supply cannot be output to the load because that the first field effect transistor is turned off and the parasitic diode of the first field effect transistor is reverse biased.

In some embodiments, the charge-discharge control circuit further includes:
- a main negative switch unit, wherein a first terminal of the main negative switch unit is connected to a negative electrode of the starting power supply, and a second terminal of the main negative switch unit is connected to a second terminal of the generator and a second terminal of the load;
- a heating module, wherein a first terminal of the heating module is connected to the second terminal of the main positive switch unit, a second terminal of the heating module is connected to the first terminal of the main negative switch unit, and a control terminal of the heating module is connected to the battery management module, and wherein the heating module is configured to heat the starting power supply.

By setting the heating module, under a condition that the temperature of the battery of the starting power supply is low, heating can be performed, thereby increasing the temperature of the starting power supply. Further, the heating module can be powered by the generator under a condition that the main negative switch unit is turned on, which is not be affected by the current direction of the main positive switch unit.

In some embodiments, the battery management module is configured to control the main positive switch unit to interrupt the current in the first current direction and control the heating module to heat the starting power supply under a condition that a temperature of a battery cell of the starting power supply is lower than a chargeable temperature range;
- wherein the battery management module is further configured to control the main positive switch unit to restore the current in the first current direction under a condition that the temperature of the battery cell of the starting power supply is raised to be within the chargeable temperature range.

By controlling the first current direction by the battery management module, it is possible to not directly charge the starting power supply under a condition that the temperature of the battery cell of the starting power supply is low. Under a condition that the starting power supply is heated until the temperature of the battery cell rises to be within the rechargeable temperature range, the battery management module can restore the current in the first current direction, so that the starting power supply can be charged at a suitable temperature of the battery cell, which avoids damage to the starting power supply caused by charging the starting power supply under a condition that the temperature of the battery cell does not meet the charging requirements.

In some embodiments, the heating module includes:
- a heating switch, wherein a control terminal of the heating switch is connected to the battery management module;
- a heating device, wherein a first terminal of the heating device is connected to the second terminal of the main positive switch unit via the heating switch, a second terminal of the heating device is connected to the first terminal of the main negative switch unit, the heating device is disposed on a surface of the starting power supply, and the heating device is configured to heat the starting power supply.

By setting the heating switch and the heating device, the heating switch can be controlled to be turned on, so that the generator supplies power to the heating device to heat the starting power supply.

In some embodiments, the heating device is a metal electrothermal film, an inorganic electrothermal film or a polymer electrothermal film.

By setting a suitable electrothermal film on the surface of the starting power supply, the electrothermal film can be powered under a condition that the heating switch is turned on, so that the electrothermal film heats the starting power supply.

In some embodiments, the charge-discharge control circuit further includes:
- a temperature sensing unit, wherein the temperature sensing unit is disposed inside the starting power supply, the temperature sensing unit is electrically connected to the battery management module, and the temperature sensing unit is configured to generate a corresponding temperature signal according to a temperature of a battery cell of the starting power supply;

wherein the battery management module is configured to determine the temperature of the battery cell of the starting power supply according to the temperature signal sent by the temperature sensing unit, and turn on the heating module under a condition that the temperature of the battery cell is lower than a first temperature threshold; and turn off the heating module under a condition that the temperature of the battery cell is higher than a second temperature threshold.

By setting the temperature sensing unit, the battery management module can determine whether to turn on the heating module to heat the starting power supply according to the temperature signal sent by the temperature sensing unit. Therefore, the starting power supply can be heated up under a condition that the temperature of the battery is low.

In some embodiments, the charge-discharge control circuit further includes:

an overcurrent protection module, wherein the overcurrent protection module is connected in series with the starting power supply, and the overcurrent protection module is configured to cut off the charge-discharge control circuit under a condition that a current of a current loop where the starting power supply is located is too large;

a sampling module, wherein the sampling module is connected in series with the starting power supply, and the sampling module is configured to detect the current of the current loop where the starting power supply is located.

By setting the overcurrent protection module and the sampling module, the loop current in the charge-discharge control circuit can be detected, and the charge-discharge control circuit may be cut off under a condition that the loop current is too large, thereby avoiding overcurrent damage to each device in the circuit.

In a second aspect, an embodiment in accordance with the present disclosure provides a charge-discharge control method applied to the above charge-discharge control circuit, wherein the method includes:

turning on the main positive switch unit under a condition that it is detected that the generator of the vehicle is turned on;

controlling the main positive switch unit to interrupt the current in the first current direction under a condition that it is detected that the voltage of the starting power supply reaches the preset voltage threshold.

Under a condition that the voltage of the starting power supply is relatively high, by controlling the main positive switch unit to interrupt the current in the first current direction, the charging loop between the generator and the starting power supply can be blocked, which avoids overcharging of the starting power supply, and makes the power supply loop between the starting power supply and the load of the vehicle remain normal. Therefore, the starting power supply can output a stable filtered voltage to other loads of the vehicle, which avoids failures or accidents caused by abnormal fluctuations of the power supply of the vehicle.

In some embodiments, before controlling the main positive switch unit to interrupt the current in the first current direction under a condition that it is detected that the voltage of the starting power supply reaches the preset voltage threshold, the method further includes:

obtaining a temperature of a battery cell of the starting power supply;

under a condition that the temperature of the battery cell is lower than a first temperature threshold, turning on the heating module and controlling the main positive switch unit to interrupt the current in the first current direction;

under a condition that the temperature of the battery cell is higher than a second temperature threshold, turning off the heating module and controlling the main positive switch unit to restore and maintain the current in the first current direction.

The battery management module can control the heating module according to the temperature of the battery cell of the starting power supply. Under a condition that the temperature of the battery cell is lower than the first temperature threshold, the heating module can be controlled to be turned on, and the generator can be controlled to stop charging the starting power supply. Under a condition that the temperature of the battery cell is higher than the second temperature threshold, the heating module can be controlled to be turned off, and the generator can be controlled to start charging the starting power supply.

In a third aspect, an embodiment in accordance with the present disclosure provides a charge-discharge control device, wherein the charge-discharge control device includes: a processor and a memory storing computer program instructions;

wherein the processor, when executing the computer program instructions, implements the above charge-discharge control method.

In a fourth aspect, an embodiment in accordance with the present disclosure provides a computer storage medium having computer program instructions stored thereon, and wherein the computer program instructions, when executed by a processor, implement the above charge-discharge control method.

According to the charge-discharge control circuit, method, device and storage medium provided by the embodiments in accordance with the present disclosure, by setting the main positive switch unit, the battery management module can detect the voltage of the starting power supply. Further, under a condition that the voltage of the starting power supply reaches the preset voltage threshold, the battery management module can control the main positive switch unit to interrupt the current in the first current direction, and the first current direction is the current direction when the generator is charging the starting power supply. At this time, the starting power supply can still supply power to other loads through the main positive switch unit, while the charging loop between the generator and the starting power supply cannot charge the starting power supply because that the current in the first current direction is interrupted. Under a condition that the voltage of the starting power supply is relatively high, the charging loop between the generator and the starting power supply may be blocked. At this time, the starting power supply can still be discharged through the main positive switch unit, thereby ensuring the stable power supply of each load and avoiding the safety accidents of the load caused by abnormal supply voltage.

BRIEF DESCRIPTION OF THE DRAWINGS

In order to more clearly illustrate the technical solutions of the embodiments in accordance with the present disclosure, the drawings to be used in the embodiments in accordance with the present disclosure will be briefly introduced below. Obviously, the drawings described below are only some embodiments in accordance with the present disclo

In the accompanying drawings: 10, starting power supply; 20, main positive switch unit; 21, reverse protection module; 30, main negative switch unit; 40, battery management module; 50, generator; 60, load; 70, heating module; 71, heating device; 80, temperature sensing unit; Fuse, overcurrent protection module; Shunt, sampling module; K1, first switch; K2, second switch; K3, heating switch; D1, diode; M1, first field effect transistor; M2, second field effect transistor.

DETAILED DESCRIPTION

Features and exemplary embodiments of various aspects of the present application will be described in detail below. In order to make the purposes, technical solutions and advantages of the present application more clear, the present application will be described in further detail below in conjunction with the accompanying drawings and specific embodiments. It should be understood that the specific embodiments described herein are only intended to explain the present application, but not to limit the present application. It will be apparent to those skilled in the art that the present application may be practiced without some of these specific details. The following description of the embodiments is merely to provide a better understanding of the present application by illustrating examples of the present application.

It should be noted that, in the present disclosure, relational terms, such as first and second, are used merely to distinguish one entity or operation from another entity or operation, without necessarily requiring or implying any actual such relationships or orders of these entities or operations. Moreover, the terms "comprise", "include", or any other variants thereof, are intended to represent a non-exclusive inclusion, such that a process, method, article or device including a series of elements includes not only those elements, but also other elements that are not explicitly listed or elements inherent to such a process, method, article or device. Without more constraints, the elements following an expression "comprise/include . . . " do not exclude the existence of additional identical elements in the process, method, article or device that includes the elements.

It should be noted that the embodiments in the present application and the features in the embodiments may be combined with each other without conflict. The embodiments will be described in detail below with reference to the accompanying drawings.

In the related art, a starting power supply of a vehicle usually receives a voltage output by a generator of the vehicle for charging, and outputs a stable voltage to supply power to each load of the vehicle. Under a condition that the output voltage of the generator cannot be adjusted, the starting power supply is prone to overcharge after the starting power supply is fully charged, resulting in an overcharge failure.

In order to avoid overcharging of the starting power supply, under a condition that the starting power supply is fully charged, the starting power supply can be disconnected from the main circuit in the vehicle to prevent the generator from continuing to charge the starting power supply. However, at this time, the starting power supply cannot continue to output a stable voltage to supply power to each load, which is likely to cause load abnormalities and lead to safety accidents.

In order to solve the above technical problems, various embodiments in accordance with the present disclosure provide a charge-discharge control circuit, method, device and a storage medium. First of all, the charge-discharge control circuit provided by the embodiments in accordance with the present disclosure will be introduced below.

The charge-discharge control circuit in various embodiments in accordance with the present disclosure can be used in, but not limited to, power consumption apparatuses such as vehicles, ships, or aircrafts. With the power supply system of the power consumption apparatus including the charge-discharge control circuit disclosed in the present application, under a condition that the voltage of the starting power supply is relative high, the starting power supply can be stopped from charging, and the starting power supply can continue to supply power to the load, thereby ensuring the stable power supply of the load.

Figure 1:
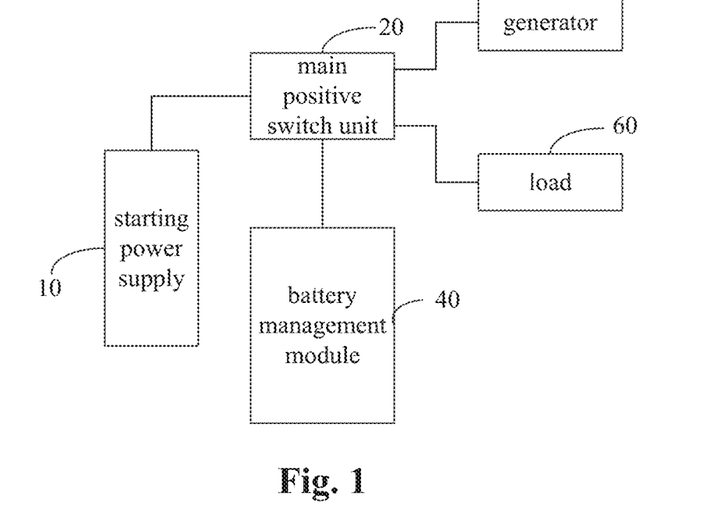
- FIG. 1 is a module structure schematic diagram of a charge-discharge control circuit provided by an embodiment in accordance with the present disclosure.

Please refer to FIG. 1. FIG. 1 is a module structure schematic diagram of a charge-discharge control circuit provided by an embodiment in accordance with the present disclosure. The charge-discharge control circuit is applied to a vehicle, and the circuit includes a starting power supply 10, a main positive switch unit 20 and a battery management module 40.

A first terminal of the main positive switch unit 20 is connected to the starting power supply 10, a second terminal of the main positive switch unit 20 is connected to a generator 50 of the vehicle, and the second terminal of the main positive switch unit 20 is connected to a load 60 of the vehicle. The main positive switch unit 20 may be configured to interrupt a current in a first current direction, and the first current direction is a current direction of a charging loop under a condition that the generator 50 charges the starting power supply 10.

The battery management module 40 may be configured to detect a voltage of the starting power supply 10, and control the main positive switch unit 20 to interrupt the current in the first current direction under a condition that the voltage of the starting power supply 10 reaches a preset voltage threshold, so that the generator 50 stops charging the starting power supply 10.

The starting power supply is a portable power supply that is installed in a power consumption apparatus such as a vehicle, a ship, or an aircraft, and can integrate power supply and charging functions. Taking the power consumption apparatus being a vehicle as an example, the vehicle can charge the starting power supply through an internal generator, the starting power supply can supply power to various loads in the vehicle, and the starting power supply can also be used for emergency start when the car stalls and cannot start. The starting power supply can be a lithium battery, or a lead-acid battery, or a sodium-ion battery. In this embodiment, the lithium battery is used as the starting power supply.

The battery management module 40 can intelligently manage each power supply or battery unit in the power consumption apparatus, monitor the state of charge of the battery, that is, the remaining power of the battery, and prevent the battery from overcharging and overdischarging, thereby prolonging the battery life. The battery management module 40 can also wirelessly communicate with a smart device of a user, so as to send the real-time state of the battery in the power consumption apparatus to the smart device, or receive corresponding control instructions sent by the user through the smart device to control the state of the battery.

Under a condition that the voltage of the starting power supply 10 does not reach the preset voltage threshold, the current direction on the main positive switch unit 20 can be bidirectional, that is, the generator 50 can charge the starting power supply 10, and the starting power supply 10 can provide a stable voltage for other loads 60 on the vehicle.

Under a condition that the voltage of the starting power supply 10 reaches the preset voltage threshold, it means that the starting power supply 10 has reached a full charge. At this time, the battery management module 40 can control the main positive switch unit 20 to interrupt the current in the first current direction, and the direction of the current through the main positive switch unit 20 may be set to flow from the first terminal of the main positive switch unit 20 to the second terminal of the main positive switch unit 20. At this time, the starting power supply 10 can still output a stable voltage to supply power to each load 60, but the output voltage of the generator 50 cannot charge the starting power supply 10. Therefore, the starting power supply 10 can stop receiving the output voltage of the generator 50 under a condition that the starting power supply 10 is fully charged, and the starting power supply 10 can continue to output a stable voltage to supply power to each load 60 on the vehicle, which avoids safety accidents caused by abnormal fluctuations of the power supply of the vehicle.

In this embodiment, by setting the main positive switch unit 20, the battery management module 40 can detect the voltage of the starting power supply 10, and can set the current direction of the main positive switch unit 20 according to the voltage. Under a condition that the voltage of the starting power supply 10 does not reach the preset voltage threshold, the current direction of the main positive switch unit 20 can be set to be bidirectional. At this time, the generator 50 can charge the starting power supply 10 through the main positive switch unit 20. The starting power supply 10 can also output a stable voltage through the main positive switch unit 20, so as to supply power to each load 60. Under a condition that the voltage of the starting power supply 10 reaches the preset voltage threshold, in order to avoid overcharging caused by continuing to charge the starting power supply 10, the battery management module 40 can control the main positive switch unit 20 to interrupt the current in the first current direction, so that the current direction of the main positive switch unit 20 is from the first terminal to the second terminal. At this time, the starting power supply 10 can continue to supply power to the load 60, and the generator 50 stops charging the starting power supply 10, thereby avoiding overcharging of the starting power supply 10. By controlling the current direction of the main positive switch unit 20, under a condition that the starting power supply 10 is not fully charged, the starting power supply 10 can be charged through the main positive switch unit 20, and the starting power supply 10 can also be discharged through the main positive switch unit 20. Under a condition that the starting power supply 10 is fully charged, the charging loop between the generator 50 and the starting power supply 10 may be blocked. At this time, the starting power supply 10 can still be discharged through the main positive switch unit 20, thereby ensuring the stable power supply of the load 60.

Figure 2:
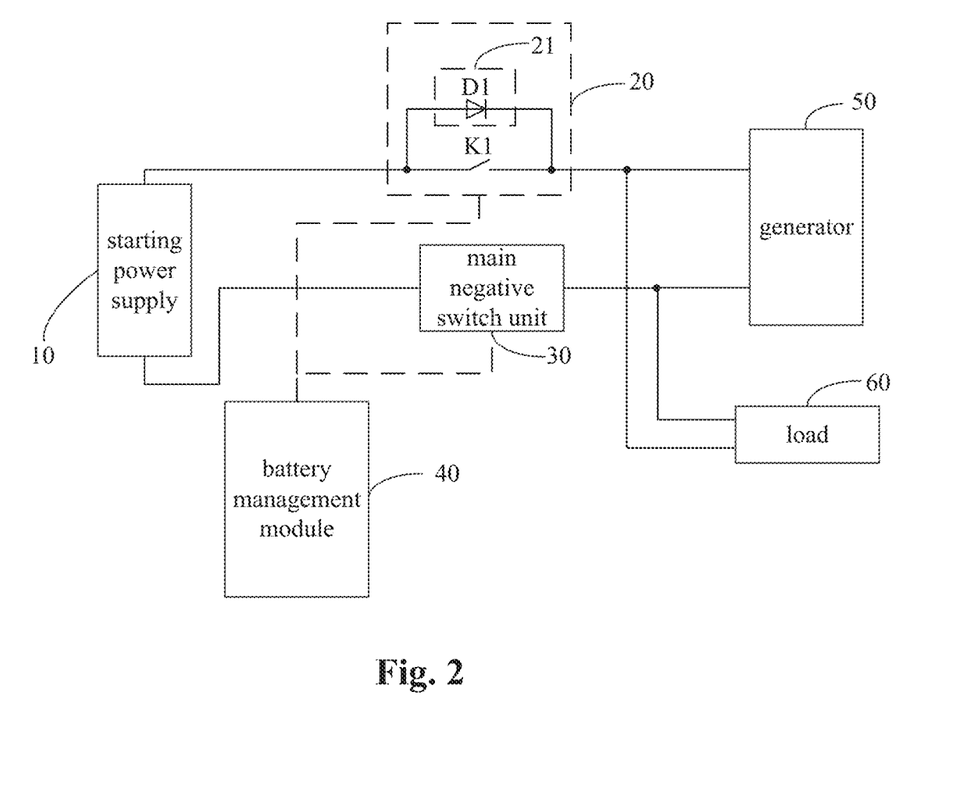
FIG. 2 is a module structure schematic diagram of a charge-discharge control circuit provided by another embodiment in accordance with the present disclosure.

Please refer to FIG. 2. In some embodiments, the main positive switch unit 20 may includes a first switch K1 and a reverse protection module 21. A first terminal of the first switch K1 is connected to a positive electrode of the starting power supply 10, and a second terminal of the first switch K1 is connected to a first terminal of the generator 50 and a first terminal of the load 60. The reverse protection module 21 is connected in parallel with the first switch K1. The reverse protection module 21 may maintain a current in a second current direction, and may interrupt the current in the first current direction. The second current direction is a current direction of a power supply loop under a condition that the starting power supply 10 supplies power to the load 60. The first current direction is a current direction of a charging loop under a condition that the generator 50 charges the starting power supply 10.

The battery management module 40 can detect the voltage of the starting power supply 10. Under a condition that the voltage of the starting power supply 10 is lower than the preset voltage threshold, the first switch K1 may be controlled to be turned on, and the current direction of the main positive switch unit 20 can be bidirectional. That is, the starting power supply 10 may receive the output voltage of the generator 50 for charging, and may also output a stable voltage to supply power to the load 60. Under a condition that the voltage of the starting power supply 10 reaches the preset voltage threshold, the battery management module 40 can control the first switch K1 to turn off. At this time, the starting power supply 10 can output a stable voltage through the reverse protection module 21, so as to supply power to each load 60. The charging loop between the generator 50 and the starting power supply 10 may be blocked under a condition that the first switch K1 is turned off, thereby realizing the unidirectional stable voltage output of the starting power supply 10. It can be understood that under a condition that the first switch K1 is turned off, as long as the reverse protection module 21 can satisfy that the output voltage of the starting power supply 10 can be transmitted to the load 60 through the reverse protection module 21, and the output voltage of the generator 50 cannot be transmitted to the starting power supply 10 through the reverse protection module 21, the purpose of the present application can be achieved.

By setting the first switch K1 and the reverse protection module 21, under a condition that the first switch K1 is turned on, the starting power supply 10 can be charged and discharged; under a condition that the first switch K1 is turned off, the starting power supply 10 can be discharged, and the charging of the starting power supply 10 can be stopped.

In some embodiments, please refer to FIG. 2 again, the reverse protection module 21 may include a diode D1, wherein an anode of the diode D1 is connected to the first terminal of the first switch K1, and a cathode of the diode D1 is connected to the second terminal of the first switch K1.

Under a condition that the first switch K1 is turned off, the diode D1 can limit the current direction to the direction from the positive electrode to the negative electrode. At this time, the starting power supply 10 can output a stable voltage through the diode D1, and the output voltage of the generator 50 is blocked by the diode D1. Therefore, it is possible to stop the charging of the starting power supply 10 under a condition that the voltage of the starting power supply 10 is fully charged. It can be understood that the diode D1 can be a high-power diode, and under a condition that the starting power supply 10 supplies power to each load 60, the diode D1 can be prevented from being damaged due to excessive output current.

By setting the diode D1, under a condition that the first switch K1 is turned off, the starting power supply 10 can output a stable voltage to the load 60 through the diode D1, and the charging voltage output by the generator 50 cannot be output to the starting power supply 10 due to the diode D1.

Figure 3:
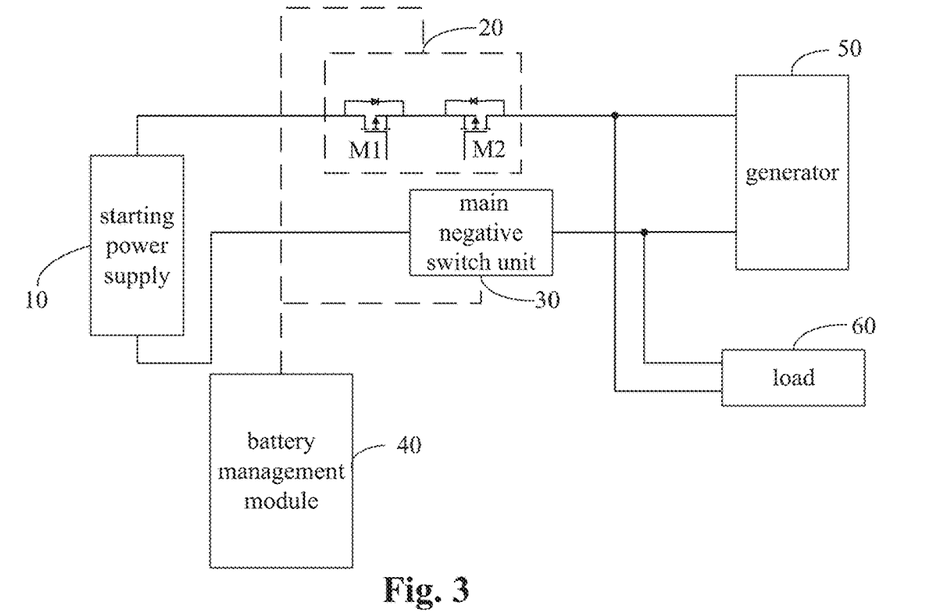
FIG. 3 is a module structure schematic diagram of a charge-discharge control circuit provided by another embodiment in accordance with the present disclosure.

Please refer to FIG. 3. In some embodiments, the above main positive switch unit 20 may include a first field effect transistor M1 and a second field effect transistor M2. A first terminal of the first field effect transistor M1 may be connected to a positive electrode of the starting power supply 10. A first terminal of the second field effect transistor M2 may be connected to a first terminal of the generator 50 or a first terminal of the load 60, and a second terminal of the second field effect transistor M2 may be connected to a second terminal of the first field effect transistor M1.

The second field effect transistor M2 is provided with a parasitic diode, an anode of the parasitic diode is connected to the second terminal of the second field effect transistor M2, and a cathode of the parasitic diode is connected to the first terminal of the second field effect transistor M2. The parasitic diode can be disposed in the field effect transistor, and under a condition that the field effect transistor receives a reverse current, the reverse current is freewheeled to prevent the reverse current from breaking down the field effect transistor. The parasitic diode may include a P-N junction formed by a P-type semiconductor and an N-type semiconductor, a space charge layer is formed on both sides of the interface of the P-N junction, and a self-built electric field is built. Under a condition that there is no applied voltage at both terminals of the parasitic diode, the diffusion current caused by the difference in carrier concentration on both sides of the P-N junction is equal to the drift current caused by the self-built electric field, which is in an electrical equilibrium state. In this embodiment, the parasitic diode can be turned on when receiving the current output by the starting power supply 10, and can transmit the current output by the starting power supply 10 to the load 60 to supply power to the load 60. The battery management module 40 can detect the voltage of the starting power supply 10. Under a condition that the voltage is lower than the preset voltage threshold, the battery management module 40 can turn on the first field effect transistor M1 and the second field effect transistor M2. At this time, the generator 50 can charge the starting power supply 10, and the starting power supply 10 can output a stable voltage to supply power to the load 60.

By setting the first field effect transistor M1 and the second field effect transistor M2, under a condition that the voltage of the starting power supply 10 reaches the preset voltage threshold, the battery management module 40 can control the first field effect transistor M1 to be turned on and the second field effect transistor M2 to be turned off. At this time, the starting power supply 10 can output a stable voltage through the first field effect transistor M1 and the parasitic diode of the second field effect transistor M2, and the generator 50 cannot continue to charge the starting power supply 10 because the parasitic diode of the second field effect transistor M2 limits the current direction.

It can be understood that the first field effect transistor M1 may also be provided with a parasitic diode, and by controlling the first field effect transistor M1 to be turned off and the second field effect transistor M2 to be turned on, the main positive switch unit 20 can also interrupt the current in the second current direction. That is, at this time, the generator 50 can charge the starting power supply 10, and the stable voltage output by the starting power supply 10 cannot be output to the load 60 because the first field effect transistor M1 is turned off and the parasitic diode of the first field effect transistor M1 is reverse biased.

Figure 4:
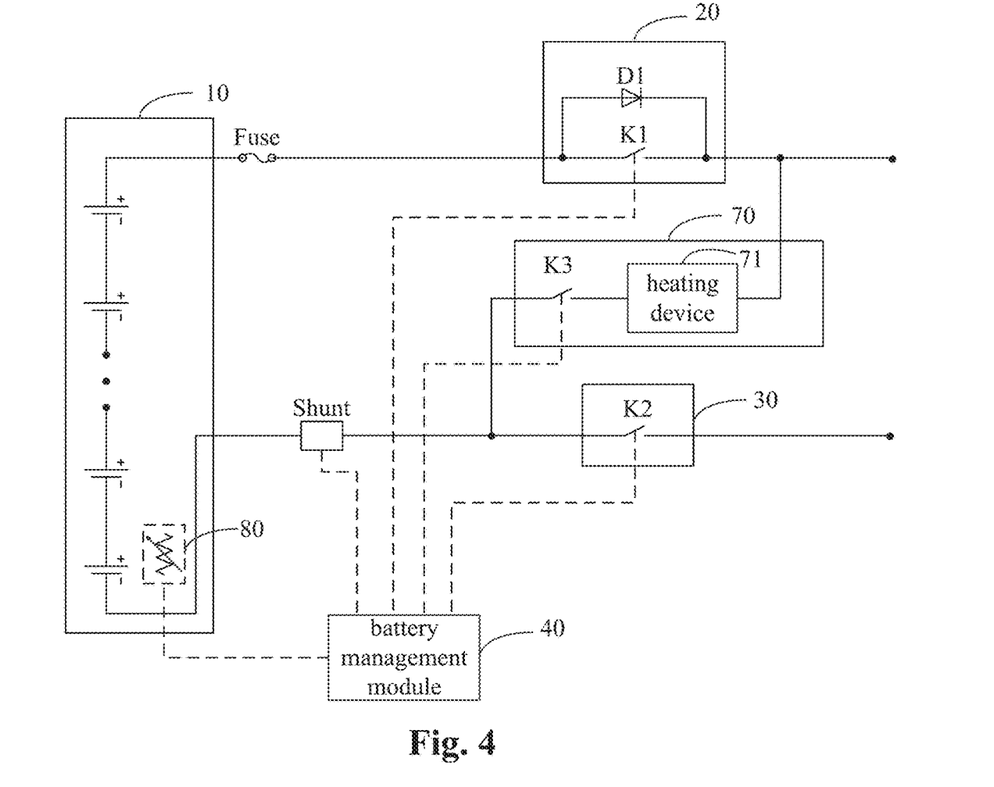
FIG. 4 is a circuit structure schematic diagram of a charge-discharge control circuit provided by an embodiment in accordance with the present disclosure.

Please refer to FIG. 4. In some embodiments, the above charge-discharge control circuit may further include a main negative switch unit 30 and a heating module 70.

A first terminal of the main negative switch unit 30 is connected to a negative electrode of the starting power supply 10, and a second terminal of the main negative switch unit 30 is connected to a second terminal of the generator 50 or a second terminal of the load 60. A first terminal of the heating module 70 is connected to the second terminal of the main positive switch unit 20, a second terminal of the heating module 70 is connected to the first terminal of the main negative switch unit 30, and a control terminal of the heating module 70 is connected to the battery management module 40. The heating module 70 may be configured to heat the starting power supply 10. The main negative switch unit 30 may include a second switch K2.

The first switch K1 and the second switch K2 may be relays. The battery management module 40 can control the heating module 70 to be turned on or off. Under a condition that the heating module 70 is turned on, the starting power supply 10 can be heated to increase the temperature of the battery of the starting power supply 10. Under a condition that the heating module 70 is turned off, the heating of the starting power supply 10 can be stopped. Since the two terminals of the heating module 70 are respectively connected to the second terminal of the main positive switch unit 20 and the first terminal of the main negative switch unit 30, under a condition that the main positive switch unit 20 interrupts the current in the first current direction, the generator 50, the heating module 70 and the main negative switch unit 30 may form a current loop, so that the generator 50 can supply power to the heating module 70. That is, under a condition that the battery management module 40 controls the main positive switch unit 20 to interrupt the current in the first current direction, the generator 50 can also supply power to the heating module 70, so that the heating module 70 can heat the starting power supply 10.

It should be noted that, under a condition that the temperature of the battery cell of the starting power supply 10 is low, the allowable charging current of the starting power supply 10 is small. However, the output current of the generator 50 is usually a relatively large current, for example, the output current of the generator 50 in an idle state can reach more than 40 A. At this time, the generator 50 may cause damage to the starting power supply 10 when charging the starting power supply 10. Therefore, it is necessary to increase the temperature of the battery cell of the starting power supply 10 by heating the starting power supply 10, so as to increase the allowable charging current of the starting power supply 10 to the output current of the generator 50. In the process of heating the starting power supply 10, since the output current of the generator 50 is relatively large, the battery management module 40 needs to set the main positive switch unit 20 to interrupt the current in the first current direction, so as to block the generator 50 from charging the starting power supply 10. Under a condition that the temperature of the battery of the starting power supply 10 rises to meet the charging requirement, the battery management module 40 may set the current direction of the main positive switch unit 20 to bidirectional, so as to charge the starting power supply 10.

By setting the main negative switch unit 30 and the heating module 70, under a condition that the temperature of the starting power supply 10 is low and the starting power supply 10 cannot be charged, the generator 50 can supply power to the heating module 70, so that the heating module 70 can heat the starting power supply 10, and the temperature of the starting power supply 10 may be raised to a chargeable temperature range.

In some embodiments, please refer to FIG. 4 again, the above heating module 70 may include a heating device 71 and a heating switch K3. The control terminal of the heating switch K3 is connected to the battery management module 40, and the battery management module 40 can control the heating switch K3 to be turned on and off. The first terminal of the heating device 71 is connected to the second terminal of the main positive switch unit 20 via the heating switch K3, and the second terminal of the heating device 71 is connected to the first terminal of the main negative switch unit 30. The heating device 71 may be disposed on a surface of the starting power supply 10, and may heat the starting power supply 10 in a power-on state.

The heating device may enter into the power-on state when the heating switch K3 is turned on, and may receive the output voltage of the generator 50. Under a condition that the heating device is in the power-on state, the heating device can heat the starting power supply 10 to increase the temperature of the starting power supply 10. For example, the heating device may be an electrothermal film disposed on the surface of the starting power supply 10, and the electrothermal film may be a metal electrothermal film, an inorganic electrothermal film, a polymer electrothermal film, and the like.

The metal electrothermal film is formed by using a film-forming technology such as vapor phase growth. Specifically, the metal electrothermal film is a sheet-like conductive film formed by attaching a conductive metal material to an insulating material, covering another layer of insulating material on the surface of the metal layer, and tightly wrapping the metal layer in the insulating materials. After the metal electrothermal film is powered on, the internal resistance of the metal generates heat to form an electrothermal effect, thereby heating the starting power supply 10.

The inorganic electrothermal film refers to a conductive film formed by mixing a conductive material with auxiliary materials such as flame retardant and film-forming agent, and smearing them on an insulating substrate. The conductive material can be inorganic, such as graphite, SiC, $SiO_2$, conductive inks, carbon fibers, and other conductive silicates. Under a condition that a certain voltage is applied to two terminals of the inorganic electrothermal film, the conductive material can convert electrical energy into thermal energy and heat the starting power supply 10.

It should be noted that a part of the inorganic conductive material is a brittle substance at room temperature, such as $SiO_2$, and the electrothermal film using this type of substance needs to be coated on a rigid substrate, which is used as a plate-type material. Another part of the inorganic conductive material is flexible, such as conductive inks and carbon fibers.

The polymer electrothermal film is a film formed by adding conductive particles in the organic material, processing the organic material into a thin film material and then encapsulating the thin film material, or formed by coating the conductive material on the insulating material substrate, forming an organic conductive film, and then encapsulating the organic conductive film with the polymer insulating material. The polymer electrothermal film may include a silicone electrothermal film, a polyimide electrothermal film, an epoxy board electrothermal film, etc.

By setting the heating switch K3 and the heating device 71, the battery management module 40 can control the heating switch K3 to be turned on, so that the heating device 71 is powered on and the starting power supply 10 is heated. Therefore, the temperature of the battery cell of the starting power supply 10 is increased, and the starting power supply 10 can receive the output current of the generator 50 for charging.

It can be understood that the heating switch K3 may be a field effect transistor, and the heating switch K3 may also be disposed inside the battery management module 40. That is, one terminal of the heating device may connect with the first terminal of the main negative switch unit 30 through the battery management module 40.

Please refer to FIG. 4, in some embodiments, the above charge-discharge control circuit may further include a temperature sensing unit 80. The temperature sensing unit 80 may be disposed inside the starting power supply 10, and may be electrically connected to the battery management module 40.

The temperature sensing unit 80 may detect a temperature of an internal battery cell of the starting power supply 10, and may generate a corresponding temperature signal according to the temperature of the battery cell of the starting power supply 10. For example, the above temperature sensing unit 80 may be an NTC (Negative Temperature Coefficient) thermistor. Through the NTC thermistor disposed in the starting power supply 10, the battery management module 40 may detect the voltage change across the NTC thermistor to determine the real-time resistance value of the NTC thermistor, and determine the real-time temperature of the battery cell of the starting power supply 10 according to the real-time resistance value. Similarly, the temperature sensing unit 80 may also be a PTC (Positive Temperature Coefficient) thermistor or other temperature measuring elements.

By setting the temperature sensing unit 80, the battery management module 40 may receive the temperature signal sent by the temperature sensing unit 80, and may determine the temperature of the battery cell of the starting power supply 10 according to the temperature signal. Under a condition that the temperature of the battery cell is lower than the first temperature threshold, the battery management module 40 may turn on the heating module 70 to increase the temperature of the battery cell by heating the starting power supply 10. During the heating process, the battery management module 40 can also detect the temperature of the battery cell in real time. Under a condition that the temperature of the battery cell is higher than the second temperature threshold, the heating module 70 may be turned off to stop heating.

Please refer to FIG. 4 again, in some embodiments, the above charge-discharge control circuit may also be connected in series with an overcurrent protection module Fuse and a sampling module Shunt.

The overcurrent protection module Fuse can be a fuse connected in series in the current loop where the starting power supply 10 is located. Under a condition that the current is too large, the fuse can be blown to cut off the current loop where the fuse is located. The sampling module Shunt may be a shunt resistor disposed in the current loop where the starting power supply 10 is located, and the current in the current loop where the shunt resistor is located can be determined by detecting the voltage across the shunt resistor.

By setting the overcurrent protection module Fuse, the charge-discharge control circuit can be cut off when the current is too large, thereby avoiding overcurrent damage to each device in the circuit. By setting the sampling module Shunt as being electrically connected to the battery management module 40, the battery management module 40 can sample the loop current by receiving the sampling signal sent by the sampling module Shunt.

Figure 5:
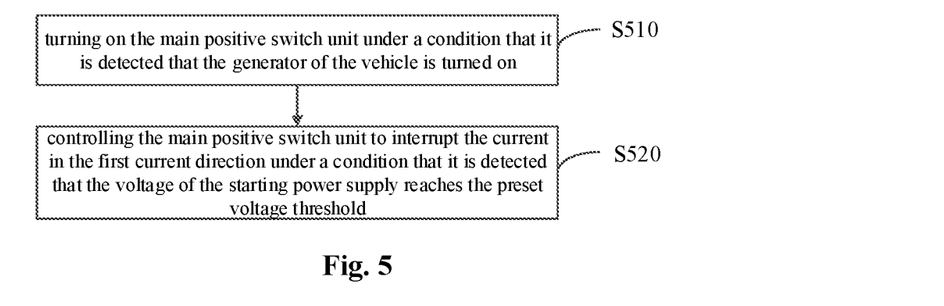
FIG. 5 is a schematic flowchart of a charge-discharge control method provided by an embodiment in accordance with the present disclosure.

Embodiments in accordance with the present disclosure also provide a charge-discharge control method applied to the battery management module of the charge-discharge control circuit in the above embodiment. As shown in FIG. 5, the charge-discharge control method may include steps S510 and S520.

S510: turning on the main positive switch unit under a condition that it is detected that the generator of the vehicle is turned on.

S520: controlling the main positive switch unit to interrupt the current in the first current direction under a condition that it is detected that the voltage of the starting power supply reaches the preset voltage threshold.

In this embodiment, by setting the main positive switch unit, the battery management module can set the current direction of the main positive switch unit according to the voltage of the starting power supply when the generator is turned on. Under a condition that the voltage of the starting power is lower than the preset voltage threshold, the main positive switch unit can be set to be turned on. At this time, the main positive switch unit does not interrupt the current in the first current direction, the generator can charge the starting power supply, and the starting power supply can also supply power to the load, so that the starting power supply can be charged and discharged. Under a condition that the voltage of the starting power supply reaches the preset voltage threshold, the main positive switch unit can be controlled to interrupt the current in the first current direction. Therefore, under a condition that the starting power supply outputs a stable voltage, the charging loop formed between the starting power supply and the generator may be cut off, thereby stopping the charging of the starting power supply. Under a condition that the voltage of the starting power supply is relatively high, by blocking the charging loop between the generator and the starting power supply, the overcharging of the starting power supply may be avoided, and the power supply loop between the starting power supply and the load of the vehicle may remain normal. Therefore, the starting power supply can output a stable filtered voltage to other loads of the vehicle, which avoids failures or accidents caused by abnormal fluctuations of the power supply of the vehicle.

In S510, the battery management module can access the bus of the vehicle, and can communicate with the vehicle. Under a condition that the battery management module detects that the generator is turned on, the main positive switch unit may be turned on. At this time, the generator can charge the starting power supply, and the starting power supply can also output a stable voltage to supply power to other loads of the vehicle.

In S520, the battery management module can detect the voltage of the starting power supply in real time. Under a condition that the voltage of the starting power supply is lower than the preset voltage threshold, the current direction of the main positive switch unit can be set to remain bidirectional. Under a condition that the battery management module detects that the voltage of the starting power supply reaches the preset voltage threshold, it indicates that the starting power supply is fully charged at this time, and if the starting power supply continues to be charged, the starting power supply will be overcharged. At this time, the battery management module can control the main positive switch unit to interrupt the current in the first current direction. At this time, the starting power supply can still continue to output a stable voltage to supply power to the load, and the charging voltage output by the generator may be blocked by the main positive switch unit and cannot be used to charge the starting power supply. Therefore, the overcharging of the starting power supply may be avoided, and the starting power supply outputting a stable filtered voltage to other loads of the vehicle may be guaranteed, which avoids failures or accidents caused by abnormal fluctuations of the power supply of the vehicle.

Figure 6:
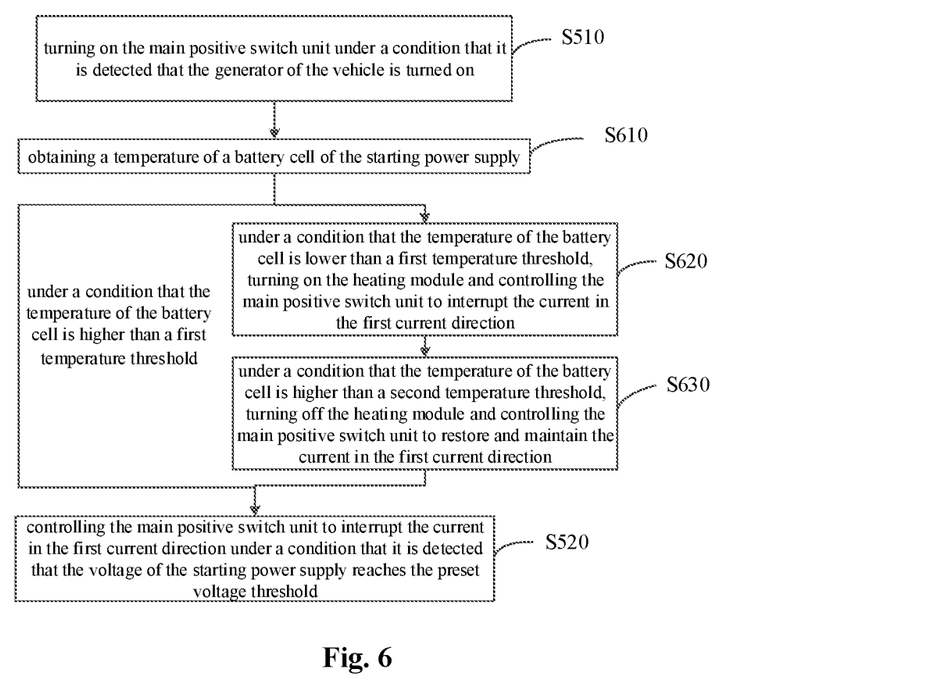
FIG. 6 is a schematic flowchart of a charge-discharge control method provided by another embodiment in accordance with the present disclosure.

As an optional embodiment, please refer to FIG. 6, before step S520, the charge-discharge control method may further include steps S610 to S630.

S610: obtaining a temperature of a battery cell of the starting power supply.

S620: under a condition that the temperature of the battery cell is lower than a first temperature threshold, turning on the heating module and controlling the main positive switch unit to interrupt the current in the first current direction.

S630: under a condition that the temperature of the battery cell is higher than a second temperature threshold, turning off the heating module and controlling the main positive switch unit to restore and maintain the current in the first current direction.

In this embodiment, the battery management module can control the heating module according to the temperature of the battery cell of the starting power supply. Under a condition that the temperature of the battery cell is lower than the first temperature threshold, the heating module can be controlled to be turned on, and the generator can be controlled to stop charging the starting power supply. Under a condition that the temperature of the battery cell is higher than the second temperature threshold, the heating module can be controlled to be turned off, and the generator can be controlled to start charging the starting power supply.

In S610, the battery management module can also detect the temperature of the battery cell of the starting power supply in real time. For example, the battery management module may be connected with a temperature sensing unit provided in the starting power supply, and may determine the temperature of the battery cell of the starting power supply by receiving a temperature signal sent by the temperature sensing unit.

In S620, under a condition that the temperature of the battery cell of the starting power supply is lower than the preset first temperature threshold, it means that the starting power supply is under a low temperature condition at this moment, and the allowable charging current is small. However, at this time, the output current of the generator is higher than the allowable range of the charging current, and if the generator charges the starting power supply, the starting power supply will be damaged. At this time, the battery management module can control the main positive switch unit to interrupt the current in the first current direction, so that the charging loop between the generator and the starting power supply is cut off, and the power supply loop between the starting power supply and each load remains in normal operation. The battery management module can also control the heating module to be turned on, so as to heat the starting power supply, thereby increasing the allowable range of the charging current of the starting power supply by increasing the temperature of the battery cell of the starting power supply.

In S630, under a condition that the battery management module detects that the temperature of the battery cell of the starting power supply is higher than the second temperature threshold, at this time, because the temperature of the battery cell of the starting power supply increases, the allowable range of the charging current of the starting power supply also increases. Under a condition that the temperature of the battery cell is higher than the second temperature threshold, it can be determined that the output current of the generator is within the allowable range of the charging current of the starting power supply. At this time, the heating module can be controlled to be turned off to stop heating, and the main positive switch unit may be controlled to restore and maintain the current in the first current direction. Therefore, the charging loop between the generator and the starting power supply may be re-conducted, and the generator can output a charging voltage through the main positive switch unit, so as to charge the starting power supply.

It can be understood that, in order to avoid changes in the temperature of the battery cell of the starting power supply, the heating module is frequently turned on and off. The first temperature threshold can be set to be lower than the second temperature threshold, then after the temperature of the battery cell of the starting power supply is heated to the first temperature threshold, the heating module will continue to heat the starting power supply to the second temperature threshold. Therefore, the temperature of the battery cell may be prevented from rapidly decreasing below the first temperature threshold and causing the heating module to start frequently. For example, the first temperature threshold may be set to 5° C. and the second temperature threshold may be set to 8° C.

As an optional embodiment, the battery management module can also detect the state of the battery of the starting power supply. Under a condition that it is detected that the starting power supply fails, the battery management module can also set the current direction of the main positive switch unit to flow from the first terminal to the second terminal of the main positive switch unit, thereby stopping the charging of the starting power supply and sending the fault information to the vehicle control system.

Figure 7:
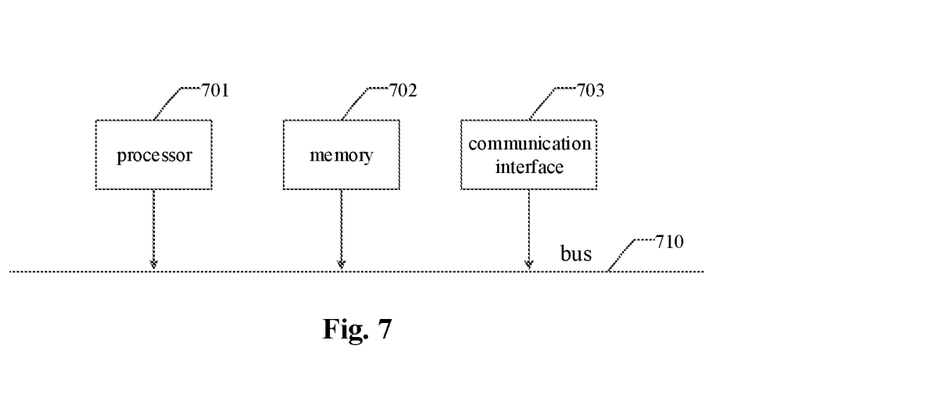
FIG. 7 is a structural schematic diagram of a charge-discharge control device provided by an embodiment in accordance with the present disclosure.

FIG. 7 illustrates a hardware structural schematic diagram of a charge-discharge control device provided by an embodiment in accordance with the present disclosure.

The charge-discharge control device may include a processor 701 and a memory 702 storing computer program instructions.

Specifically, the above processor 701 may include a central processing unit (CPU), or an application specific integrated circuit (Application Specific Integrated Circuit, ASIC), or may be configured to implement one or more integrated circuits according to the embodiments in accordance with the present disclosure.

The memory 702 may include a mass storage for data or instructions. By way of examples rather than limitation, the memory 702 may include a hard disk drive (Hard Disk Drive, HDD), a floppy disk drive, a flash memory, an optical disk, a magneto-optical disk, a magnetic tape or a universal serial bus (Universal Serial Bus, USB) drive, or a combination of two or more of them. Where appropriate, the memory 702 may include a removable or non-removable (or fixed) medium. Where appropriate, the memory 702 may be internal or external to the charge-discharge control device. In a particular embodiment, the memory 702 may be a non-volatile solid state memory.

The memory may include a read-only memory (ROM), a random access memory (RAM), a magnetic disk storage media device, an optical storage media device, a flash memory device, an electrical, optical, or other physical/tangible memory storage device. Therefore, in general, the memory includes one or more tangible (non-transitory) readable storage media (for example, a memory device) encoded with software including computer-executable instructions, and when executed (for example, by one or more processors), the software is operable to perform the operations described with reference to the charge-discharge control method according to the present disclosure.

The processor 701 reads and executes the computer program instructions stored in the memory 702 to implement any of the charge-discharge control methods in the foregoing embodiments.

In one example, the charge-discharge control device may further include a communication interface 703 and a bus 710. Here, as shown in FIG. 7, the processor 701, the memory 702, and the communication interface 703 are connected through the bus 710 and communicate with each other.

The communication interface 703 may be mainly used to implement communications among various modules, apparatuses, units, and/or devices in the embodiments in accordance with the present disclosure.

The bus 710 may include a hardware, a software, or both, and may couple the components of the charge-discharge control device to each other. By way of examples rather than limitation, the bus may include an Accelerated Graphics Port (AGP) or other graphics buses, an Enhanced Industry Standard Architecture (EISA) bus, a Front Side Bus (FSB), a Hypertransport (HT) interconnect, an Industry Standard Architecture (ISA) Bus, an infinite bandwidth interconnect, a Low Pin Count (LPC) bus, a memory bus, a Microchannel Architecture (MCA) bus, a Peripheral Component Interconnect (PCI) bus, a PCI-Express (PCI-X) bus, a Serial Advanced Technology Attachment (SATA) bus, a Video Electronics Standards Association Local (VLB) bus, or other suitable buses, or a combination of two or more of them. Where appropriate, the bus 710 may include one or more buses. Although specific buses are described and illustrated in the embodiments in accordance with the present disclosure, the present application may contemplate any suitable bus or interconnect.

The charge-discharge control device may be based on the above charge-discharge control circuit, thereby implementing the charge-discharge control method described in conjunction with FIG. 5 to FIG. 6.

In addition, in combination with the charge-discharge control method in the foregoing embodiments, the embodiments in accordance with the present disclosure may be implemented by a computer storage medium. The computer storage medium may store computer program instructions thereon; the computer program instructions may implement, when executed by a processor, any of the charge-discharge control methods in the foregoing embodiments.

Functional blocks shown in the above structural diagrams may be implemented as hardware, software, firmware, or a combination thereof. When implemented in hardware, the functional blocks may be, for example, an electronic circuit, an Application Specific Integrated Circuit (ASIC), a suitable firmware, a plug-in, a function card and the like. When implemented in software, elements of the present disclosure may be programs or code segments used to perform the required tasks. The programs or code segments may be stored in a machine-readable medium or transmitted over a transmission medium or a communication link via data signals carried in carriers. The "machine-readable medium" may include any medium capable of storing or transmitting information. Examples of the machine-readable medium may include an electronic circuit, a semiconductor memory device, a ROM, a flash memory, an erasable ROM (EROM), a floppy disk, a CD-ROM, an optical disk, a hard disk, a fiber medium, a Radio Frequency (RF) link, and the like. The code segments may be downloaded via a computer network, for example, the Internet, an intranet, and the like.

It should be noted that, here, the terms "comprise", "include", or any other variants thereof, are intended to represent a non-exclusive inclusion, such that a process, method, article or device including a series of elements includes not only those elements, but also other elements that are not explicitly listed or elements inherent to such a process, method, article or device.

The principles and implementations of the present application are described by using specific examples herein, and the descriptions of the above examples are only used to help understand the method and core ideas of the present application. The above implementations are only the preferred implementations of the present application. It should be pointed out that, due to the limitation of written expressions, there are objectively unlimited specific structures. For those of ordinary skill in the art, without departing from the principles of the present application, several improvements, modifications or changes can also be made, and the above technical features can also be combined in an appropriate manner; these improvements, modifications, or combinations, or the ideas and technical solutions of the present application can be directly applied to other occasions, which shall be regarded as falling within the protection scope of the present application.

What is claimed is:

1. A charge-discharge control system applied to a vehicle, wherein the charge-discharge control system comprises:
   a starting power supply;
   a main positive switch unit, wherein,
   a first terminal of the main positive switch unit is connected to the starting power supply, a second terminal of the main positive switch unit is connected to a generator of the vehicle, and the second terminal of the main positive switch unit is connected to a load of the vehicle, and wherein,
   the main positive switch unit is configured to interrupt a current in a first current direction, the first current direction being a current direction of a charging loop under a condition that the generator charges the starting power supply;
   a battery management module, wherein the battery management module is connected to a control terminal of the main positive switch unit, and the battery management module is connected to the starting power supply, and wherein the battery management module is configured to detect a voltage of the starting power supply, and control the main positive switch unit to interrupt the current in the first current direction under a condition that the voltage of the starting power supply reaches a preset voltage threshold, so that the generator stops charging the starting power supply;
   a main negative switch unit, wherein a first terminal of the main negative switch unit is connected to a negative electrode of the starting power supply, and a second terminal of the main negative switch unit is connected to a second terminal of the generator and a second terminal of the load; and
   a heating module, wherein a first terminal of the heating module is connected to the second terminal of the main positive switch unit, a second terminal of the heating module is connected to the first terminal of the main negative switch unit, and a control terminal of the heating module is connected to the battery management module, wherein the heating module is configured to heat the starting power supply,
   wherein under a condition that a temperature of a battery cell of the starting power supply is lower than a chargeable temperature range, the battery management module is configured to:
   control the main positive switch unit to interrupt the current in the first current direction and control the heating module to heat the starting power supply; and
   control the main negative switch unit to turn on to cause the generator, the heating module, and the main negative switch unit to form a current loop and to cause the generator to supply electric power to the heating module.

2. The charge-discharge control system according to claim 1, wherein the main positive switch unit comprises:
   a first switch, wherein a first terminal of the first switch is connected to a positive electrode of the starting power supply, and a second terminal of the first switch is connected to a first terminal of the generator and a first terminal of the load;
   a reverse protection module, wherein the reverse protection module is connected in parallel with the first switch, and the reverse protection module is configured to maintain a current in a second current direction under a condition that the first switch is turned off, the second current direction is a current direction of a power supply loop under a condition that the starting power supply supplies power to the load;
   wherein the battery management module is configured to turn on the first switch to charge and discharge the starting power supply under a condition that the voltage of the starting power supply is lower than the preset voltage threshold; and turn off the first switch to discharge the starting power supply and stop charging the starting power supply under a condition that the voltage of the starting power supply reaches the preset voltage threshold.

3. The charge-discharge control system according to claim 2, wherein the reverse protection module comprises:
   a diode, wherein an anode of the diode is connected to the first terminal of the first switch, and a cathode of the diode is connected to the second terminal of the first switch.

4. The charge-discharge control system according to claim 1, wherein the main positive switch unit comprises:

a first field effect transistor, wherein a first terminal of the first field effect transistor is connected to a positive electrode of the starting power supply;

a second field effect transistor, wherein a first terminal of the second field effect transistor is connected to a first terminal of the generator and a first terminal of the load, and a second terminal of the second field effect transistor is connected to a second terminal of the first field effect transistor, wherein the second field effect transistor is provided with a parasitic diode, an anode of the parasitic diode is connected to the second terminal of the second field effect transistor, and a cathode of the parasitic diode is connected to the first terminal of the second field effect transistor; and, wherein the battery management module is configured to turn on the first field effect transistor and the second field effect transistor under a condition that the voltage of the starting power supply is lower than the preset voltage threshold; and turn on the first field effect transistor and turn off the second field effect transistor under a condition that the voltage of the starting power supply reaches the preset voltage threshold.

5. The charge-discharge control system according to claim 4, wherein the first field effect transistor is provided with a parasitic diode, and the parasitic diode of the first field effect transistor is configured to interrupt a current in a second current direction under a condition that the first field effect transistor is turned off.

6. The charge-discharge control system according to claim 1, wherein the battery management module is further configured to control the main positive switch unit to restore the current in the first current direction under a condition that the temperature of the battery cell of the starting power supply is raised to be within the chargeable temperature range.

7. The charge-discharge control system according to claim 1, wherein the heating module comprises:

a heating switch, wherein a control terminal of the heating switch is connected to the battery management module;

a heating device, wherein a first terminal of the heating device is connected to the second terminal of the main positive switch unit via the heating switch, a second terminal of the heating device is connected to the first terminal of the main negative switch unit, the heating device is disposed on a surface of the starting power supply, and the heating device is configured to heat the starting power supply.

8. The charge-discharge control system according to claim 7, wherein the heating device is a metal electrothermal film, an inorganic electrothermal film or a polymer electrothermal film.

9. The charge-discharge control system according to claim 7, further comprising:

a temperature sensing unit, wherein the temperature sensing unit is disposed inside the starting power supply, the temperature sensing unit is electrically connected to the battery management module, and the temperature sensing unit is configured to generate a corresponding temperature signal according to a temperature of a battery cell of the starting power supply;

wherein the battery management module is configured to determine the temperature of the battery cell of the starting power supply according to the temperature signal sent by the temperature sensing unit, and turn on the heating module under a condition that the temperature of the battery cell is lower than a first temperature threshold; and turn off the heating module under a condition that the temperature of the battery cell is higher than a second temperature threshold.

10. The charge-discharge control system according to claim 1, further comprising:

an overcurrent protection module, wherein the overcurrent protection module is connected in series with the starting power supply, and the overcurrent protection module is configured to cut off a current loop where the starting power supply is located under a condition that a current of the current loop is larger than a threshold;

a sampling module, wherein the sampling module is connected in series with the starting power supply, and the sampling module is configured to detect the current of the current loop where the starting power supply is located.

11. A charge-discharge control method performed by a charge-discharge control system applied to a vehicle, wherein the charge-discharge control system comprises:

a starting power supply;

a main positive switch unit, wherein, a first terminal of the main positive switch unit is connected to the starting power supply, a second terminal of the main positive switch unit is connected to a generator of the vehicle, and the second terminal of the main positive switch unit is connected to a load of the vehicle, and wherein, the main positive switch unit is configured to interrupt a current in a first current direction, the first current direction being a current direction of a charging loop under a condition that the generator charges the starting power supply;

a battery management module, wherein the battery management module is connected to a control terminal of the main positive switch unit, and the battery management module is connected to the starting power supply;

a main negative switch unit, wherein a first terminal of the main negative switch unit is connected to a negative electrode of the starting power supply, and a second terminal of the main negative switch unit is connected to a second terminal of the generator and a second terminal of the load;

a heating module, wherein a first terminal of the heating module is connected to the second terminal of the main positive switch unit, a second terminal of the heating module is connected to the first terminal of the main negative switch unit, and a control terminal of the heating module is connected to the battery management module; and a temperature sensing unit, wherein the temperature sensing unit is disposed inside the starting power supply, the temperature sensing unit is electrically connected to the battery management module, wherein the charge-discharge control method comprises:

turning on, by the battery management module, the main positive switch unit under a condition that it is detected that the generator of the vehicle is turned on;

obtaining, by the temperature sensing unit, a temperature of a battery cell of the starting power supply;

under a condition that the temperature of the battery cell is lower than a first temperature threshold, turning on, by the battery management module, the heating module by the battery management module; controlling, by the battery management module, the main positive switch unit to interrupt the current in the first current direction by the battery management module; and controlling, by the battery management module, the main negative switch unit to turn on to cause the generator, the heating module, and the main negative switch unit to form a current loop and to cause the generator to supply electric power to the heating module;

controlling, by the battery management module, the main positive switch unit to interrupt the current in the first current direction under a condition that it is detected that a voltage of the starting power supply reaches a preset voltage threshold.

12. The charge-discharge control method according to claim 11, wherein before controlling the main positive switch unit to interrupt the current in the first current direction under a condition that it is detected that the voltage of the starting power supply reaches the preset voltage threshold, the method further comprises:

under a condition that the temperature of the battery cell is higher than a second temperature threshold, turning off, by the battery management module, the heating module and controlling, by the battery management module, the main positive switch unit to restore and maintain the current in the first current direction.

13. The charge-discharge control method according to claim 11, wherein the main positive switch further comprises:

a first switch, wherein a first terminal of the first switch is connected to a positive electrode of the starting power supply, and a second terminal of the first switch is connected to a first terminal of the generator and a first terminal of the load; and a reverse protection module connected in parallel with the first switch, and the charge-discharge control method further comprises:

turning on the first switch, by the battery management module, to charge and discharge the starting power supply under a condition that the voltage of the starting power supply is lower than the preset voltage threshold;

turning off, by the battery management module, the first switch to discharge the starting power supply and stop charging the starting power supply under a condition that the voltage of the starting power supply reaches the preset voltage threshold; and maintaining, by the reverse protection module, a current in a second current direction under when the first switch is turned off, wherein the second current direction is a current direction of a power supply loop under a condition that the starting power supply supplies electric power to the load.

14. The charge-discharge control method according to claim 11, wherein the main positive switch unit further comprises:

a first field effect transistor connected to a positive electrode of the starting power supply; and a second field effect transistor, wherein a first terminal of the second field effect transistor is connected to a first terminal of the generator and a first terminal of the load, and a second terminal of the second field effect transistor is connected to a second terminal of the first field effect transistor, wherein the second field effect transistor comprises a parasitic diode, an anode of the parasitic diode is connected to the second terminal of the second field effect transistor, and a cathode of the parasitic diode is connected to the first terminal of the second field effect transistor, and the charge-discharge control method further comprises:

turning on, by the battery management module, the first field effect transistor and the second field effect transistor under a condition that the voltage of the starting power supply is lower than the preset voltage threshold; and turning on, by the battery management module, the first field effect transistor and turn off the second field effect transistor under a condition that the voltage of the starting power supply reaches the preset voltage threshold.

15. The charge-discharge control method according to claim 14, wherein the first field effect transistor comprises a parasitic diode, and charge-discharge control method further comprises:

controlling, by the battery management module, the parasitic diode of the first field effect transistor to interrupt a current in a second current direction under a condition that the first field effect transistor is turned off.

16. The charge-discharge control method according to claim 11, further comprising:

controlling, by the battery management module, the main positive switch unit to restore the current in the first current direction under a condition that the temperature of the battery cell of the starting power supply is within a chargeable temperature range.

17. A charge-discharge control device, wherein the charge-discharge control device comprises: a processor and a memory storing computer program instructions;

wherein the processor, when executing the computer program instructions, implements the charge-discharge control method according to claim 11.

18. A computer storage medium having computer program instructions stored thereon, and wherein the computer program instructions, when executed by a processor, implement the charge-discharge control method according to claim 11.

* * * * *